W. CASTEDELLO ET AL   3,561,856
SOUND SLIDE PROJECTOR

Filed Sept. 3, 1968                                    9 Sheets-Sheet 5

FIG. 4C

| | | LIFT/LOWER ARM | | TRAY LOCK | | ROTATING BAR | |
|---|---|---|---|---|---|---|---|
| STEP | DESCRIPTION | 73a | 73b | 75a | 75b | 76a | 76b |
| A' | CARTRIDGE #1 OPERATING | x | | x | | x | |
| B' | SLIDE #1 RAISED | | x | x | | x | |
| C' | TRAY TURNS THRU FIRST HALF-SPACE | | x | | x | x | |
| | | | x | | x | | x |
| D' | TRAY LOCKS; ROTATING BAR RETURNS | | x | x | | | x |
| | | | x | x | | x | |
| A" | ARM LOWERED | x | | x | | x | |
| B" | ARM RAISED | | x | x | | x | |
| C" | TRAY TURNS THRU SECOND HALF-SPACE | | x | | x | x | |
| | | | x | | x | | x |
| D" | CARTRIDGE #2 IN OPERATING POSITION | | x | x | | | x |
| | | | x | x | | x | |
| A''' | SLIDE #2 LOWERED | x | | x | | x | |

FIG. 4D

INVENTORS
WILLIAM CASTEDELLO
STEPHEN G. GILVAR
RAY L. MARQUIS

BY Hane and Baily

ATTORNEYS

Feb. 9, 1971 W. CASTEDELLO ET AL 3,561,856
SOUND SLIDE PROJECTOR
Filed Sept. 3, 1968 9 Sheets-Sheet 5

INVENTORS
WILLIAM CASTEDELLO
STEPHEN G. GILVAR
RAY L. MARQUIS
BY
Hane and Baxley
AGENTS Feb. 9, 1971  W. CASTEDELLO ET AL  3,561,856
SOUND SLIDE PROJECTOR

Filed Sept. 3, 1968  9 Sheets-Sheet 6

INVENTORS
WILLIAM CASTEDELLO
STEPHEN G. GILVAR
BY RAY L. MARQUIS

Hans and Bayley

ATTORNEYS

United States Patent Office 3,561,856
Patented Feb. 9, 1971

3,561,856
SOUND SLIDE PROJECTOR
William Castedello, Southington, Stephen G. Gilvar, New Britain, and Ray L. Marquis, Brookfield, Conn., asignors to The Kalart Company, Inc., Plainville, Conn., a corporation of New York
Filed Sept. 3, 1968, Ser. No. 757,023
Int. Cl. G03b 31/06
U.S. Cl. 353—19
20 Claims

ABSTRACT OF THE DISCLOSURE

A sound slide projector for projecting still pictures, particularly slides, and playing back sound recorded on magnetic tape or recording sound on such tape has a tray for accommodating a plurality of cartridges each including magnetic tape from which sound is to be played back or on which sound is to be recorded and a compartment for releasably retaining a slide to be projected. The tray has a plurality of compartments open at the bottom and each accommodating one of the cartridges and is movable with reference to a platform including a discharge slot. Stepwise of the movement of the tray brings successive cartridges into registry with the discharge slot to permit dropping of the respective slide into a presentation position. Each slide is returned from the presentation position into the respective cartridge upon completion of a presentation. The sound projector further has an optical system for projecting a slide in the presentation position and a sound system for reproducing sound from the tape of the respective cartridge or recording sound on such tape. A drive mechanism including a play-back capstan pulls the tape in a cartridge in the presentation position past the sound head of the projector and a rewind mechanism including a rewind capstan rewinds the tape upon completion of a play-back or recording. A cycling mechanism operates tray moving means, the sound system, the optical system and slide returning means in a predetermined sequence and time relationship.

---

The present invention relates to a projector for projecting a sequence of still pictures and audible reproducing sound records each associated with one still picture. More particularly, the invention relates to a sound slide projector for projecting still pictures in the form of framed photographic transparencies commonly referred to as slides and sound recordings on magnetic tape supported in a cartridge.

There are known sound slide projectors which comprise a projecting unit and a sound unit structurally and physically separated from each other. The sound to be audibly reproduced with projectors of this kind may be magnetically recorded on a suitable carrier such as tape, wire, a disc coated with magnetic material, or a disc bearing a spirally grooved sound track. The two units may be and are frequently functionally coupled in that upon completion of a playback of the recording a signal is transmitted by the sound unit to the projecting unit causing the latter to advance a new slide into position for projection.

Apparatus of this kind have the disadvantage that they must be carefully set up for each presentation of slides and physically separated associated sound record carriers and that they require considerably space and synchronization of their separate functions. The slides and the sound record carriers must be synchronized so that each slide is functionally associated with the correct sound record carrier, which is time consuming. Moreover, practical experience shows that confusion between slides and the appropriate sound record is not infrequent, or that the sound record carrier belonging to a specific slide is lost.

It is an object of the invention to provide a novel and improved sound slide projector in which a projecting assembly and a sound reproducing assembly are structurally and functionally combined.

It is also an object of the invention to provide a novel and improved sound slide projector which is ready for projection and audible reproduction of sound without requiring setting up of the projection assembly and of the sound assembly for each presentation, which requires less space than conventional apparatus having physically separated projection and sound assemblies, and eliminates all danger of wrongly combining slides and sound records, or losing either a slide or a sound record constituting in combination a presentation of picture and sound.

Another object of the invention is to provide a novel and improved sound slide projector which is capable of automatically presenting a succession of slides each accompanied by associated playback of sound.

Still another object of the invention is to provide a novel and improved sound slide projector which accepts a plurality of cartridges each containing a slide and a record carrier in the form of magnetic tape or wire and which automatically triggers an advance from cartridge to cartridge upon completion of a presentation of picture and sound.

A further object of the invention is to provide a novel and improved sound slide projector which includes as part of the apparatus convenient and simple repeat control means for repeating the presentation of the slide and the associated sound record in selected cartridges.

It is also an object of the invention to provide a sound slide projector according to the invention with equipment for recording sound on the sound record carrier contained in the afore-referred to cartridges.

A further object of the invention is to provide a novel and improved sound slide projector in which rewind of the tape or wire is effected by a rewind mechanism common to all cartridges accommodated in the projector.

Still another object of the invention is to provide a novel and improved sound slide projector in which the slide of a cartridge in the presentation position is removed from the cartridge to a projection position and returned into the cartridge upon completion of the presentation and in which the tape in the cartridge after being played back or recorded upon is rewound by the common rewind mechanism.

Still another object of the invention is to provide a novel and improved cartridge including a compartment for releasably retaining a slide therein and a magnetic tape support and suitable for use in a sound slide projector according to the invention.

It is also an object of the invention to provide a novel and improved sound slide projector which accepts a plurality of cartridges of the general kind hereinbefore referred to and which, in addition, automatically controls one or several further operations, for instance, projection of silent slides by means of a second or slave slide projector in such a way that the sound slide projector and the second slide projector function in the manner of a "master and slave team."

Other and further objects, features and advantages of the invention will be pointed out hereinafter and set forth in the appended claims constituting part of the application.

In the accompanying drawings, a preferred embodiment of a projector according to the invention and of a cartridge according to the invention, are shown by way of illustration and not by way of limitaticn.

Referring now to the figures more in detail and first to FIGS. 1 to 4D, the exemplified projector according to the invention comprises a lower housing 41 which is composed of a base 42 and a surrounding part 43. Parts 42 and 43 may be made of any suitable material such as molded plastic. Part 43 supports a horizontally disposed annular plate 44 which is continued at its inner periphery by a generally frusto-conical part 45 extending downwardly to base 42, preferably resting upon the same. The annular plate is unbroken except for a generally radial slot 46. An inner part of a suitable bearing 48 such as a ball bearing or a roller bearing rises from the center of base part 42 as can best be seen in FIG. 3.

Lower housing 41 accommodates a diagrammatically indicated conventional projecting system 49 including a focusing lens 51 (FIG. 2) for projecting an image of a slide 50 in the direction of an arrow 52. The image of the slide should be visualized as being projected upon an external screen (not shown) in a conventional fashion.

The lower housing supports an upper housing 55 formed by an outer wall 56, an inner wall 57, a cover 58 and a bottom 59. The upper housing defines a generally annular shape 60 accommodating a drive mechanism 61 for the projector and electronic sound equipment 62. The electronic equipment should be visualized as being generally conventional. It may include a pre-amplifier 63, a power supply 64, controls 65, a VU meter 66, volume and tone controls 67 and 68 and one or several loudspeakers 69.

Drive mechanism 61 which will be more fully described hereinafter, is diagrammatically indicated in FIG. 1. Its principal components are a drive motor 101, a transmission 106 coupling the motor to a capstan 142 in a capstan assembly 118 as described later on, a magnetic head assembly 285 which may include one or several sound heads for playback or recording and an erase head.

Figure 3:
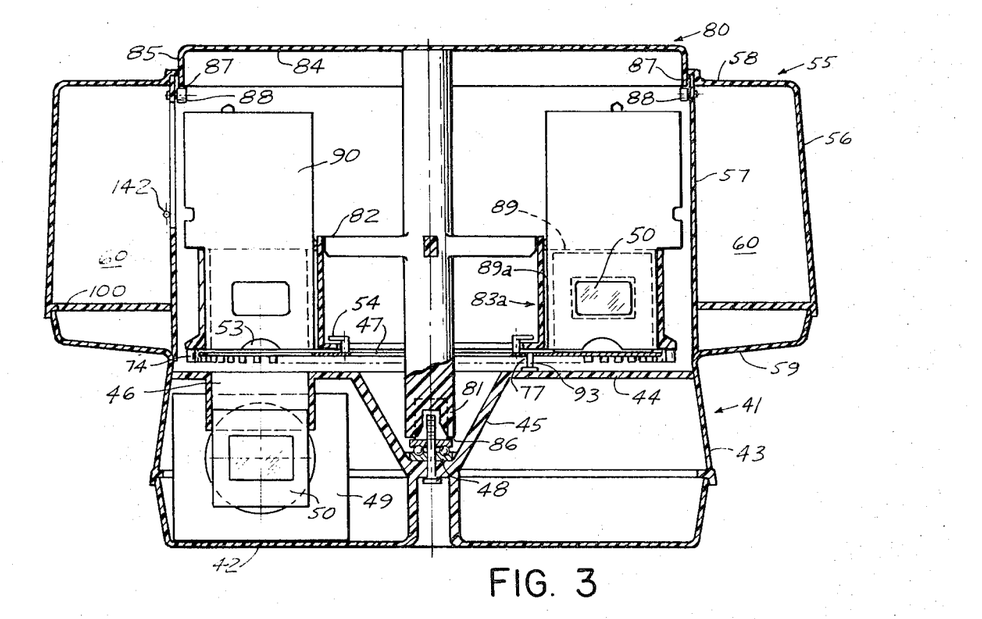
FIG. 3 is an elevational view, partly in section, of FIG. 1, taken on line 3—3 of FIG. 1.
Figure 4C:
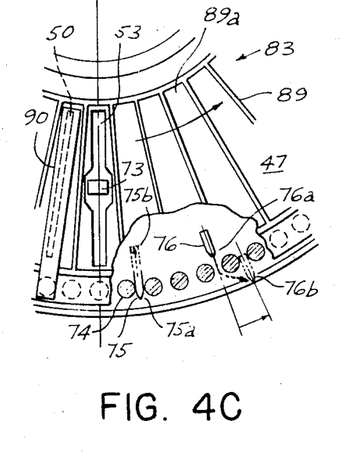
FIG. 4C is a fragmentary plan view of FIG. 1.
Figure 4D:
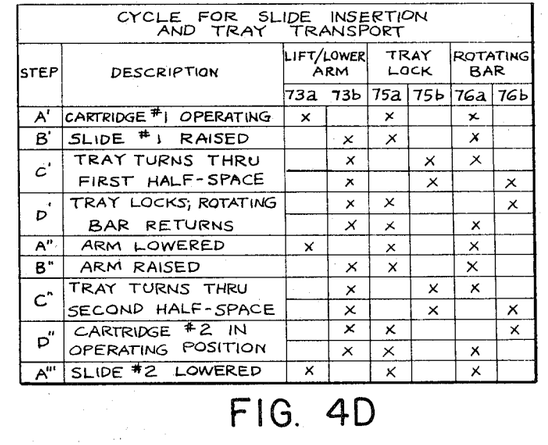
FIG. 4D is a schedule of the slide insertion and tray transport cycle.

Components 101, 106, 118 and 285 are all mounted on an annular platform 100 which is supported between outer wall 56 and bottom 59 of upper housing 55 as can best be seen in FIG. 3. Lower housing 41 and upper housing 55 further accommodate a rotatable assembly 80. This assembly comprises a lower support section 81 journalled upon bearing 48 on base 42, an upper support section 82, a cartridge carrier or tray 83 which is preferably a molded body, for a supply of cartridges 90, a top cover 84 and a side cover 85.

Components 81 to 85 all have a circular cross-section and are joined to each other in a rigid unit terminating in an inner bearing member 86 at the lower end of section 81 and a smooth peripheral rim 87 at the lower end of cover 85. Several circumferentially spaced rollers 88 at the juncture of inner wall 57 of upper housing 55 and cover 58 support the entire assembly 80 at rim 87.

Figures 1, 4A, 4B:
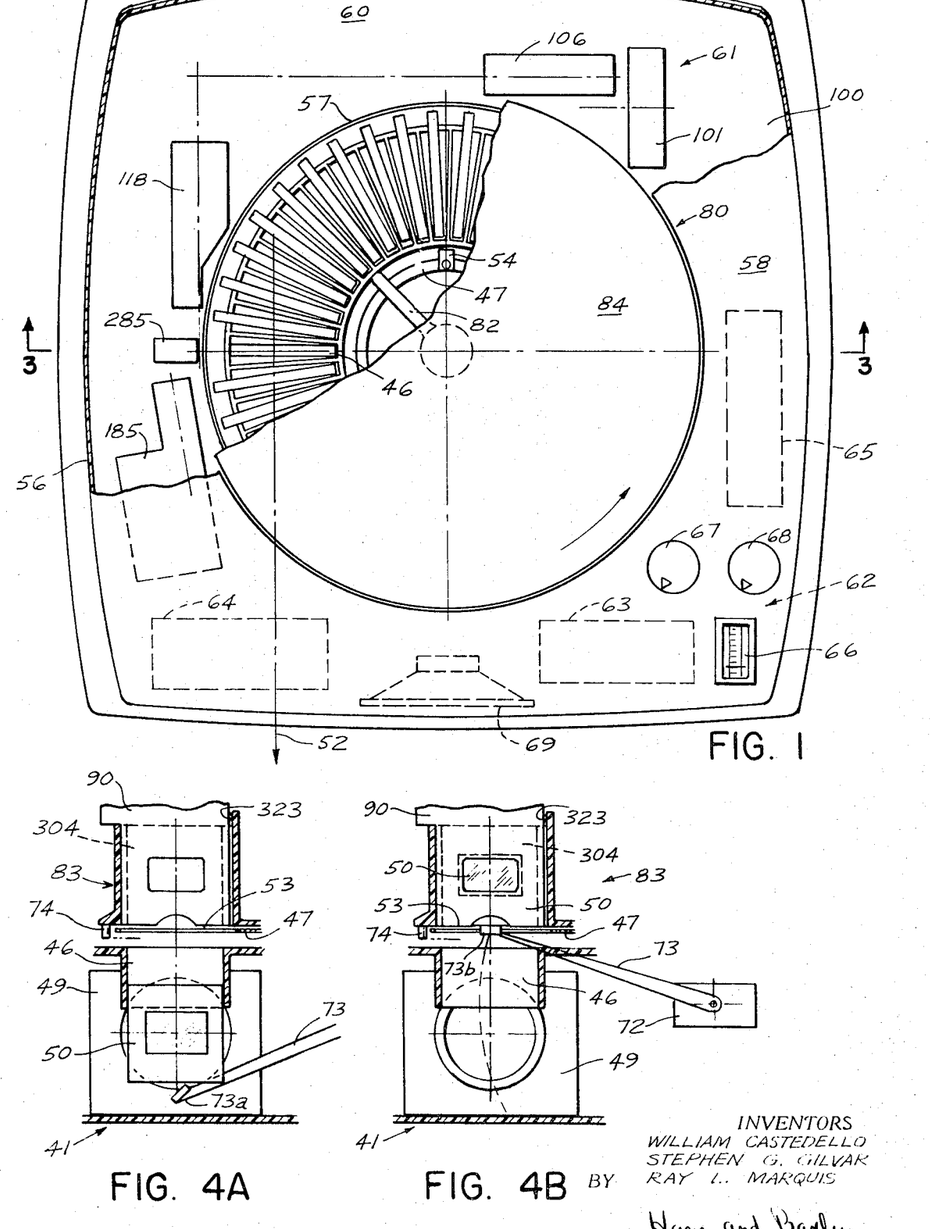
FIG. 1 is a plan view of a projector according to the invention, partly in section.
FIG. 4A is a fragmentary elevational view of FIG. 3.
FIG. 4B is the same view as FIG. 4A but in another position of operation.
Figure 2:
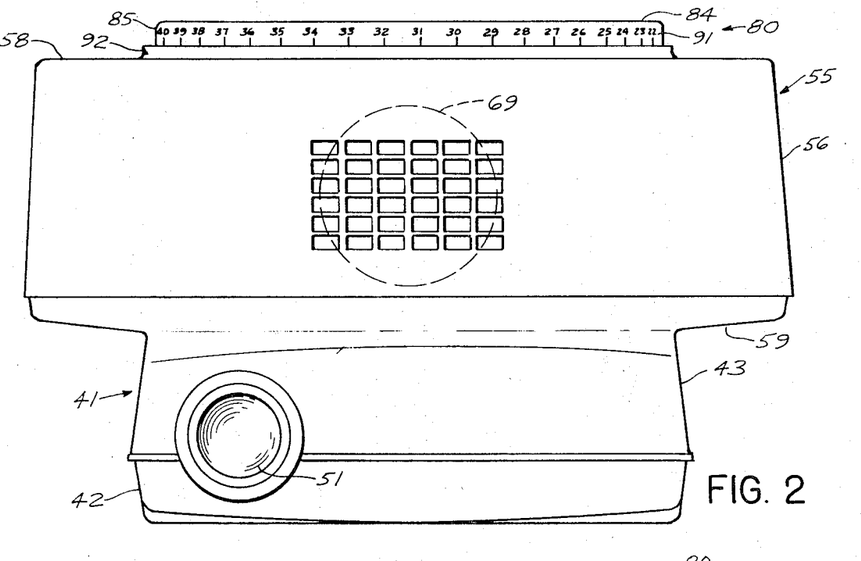
FIG. 2 is an elevational view of FIG. 1.

Cartridge tray 83 has a plurality of radial partition walls 89 which define within the tray forty-one radially disposed generally rectangular compartments 89a open at the top and the bottom as can best be seen in FIGS. 1 and 3. Cover 85 is marked on its outside with numerals 91 reading "0" and "1 to 40." The numerals are positioned to be placed selectively or successively in registry with a marker 92 on cover 85 to index the cartridge within tray 83. Compartments 89a associated with numbers 1 to 40 are all filled with cartridges when the cartridge tray is fully loaded. The numeral "0" constitutes a starting position as will be more fully explained hereinafter. As previously stated, the cartridge tray is open at the top and the bottom. The top opening of the carrier serves to load or empty the tray and the bottom opening permits movement of a slide 50 from its upper position into its lower or presentation position in which it is shown on the left-hand side of FIG. 3.

The bottom openings in the tray 83 are covered by an annular plate 47 including a radial slot 53, rotatably retained on the tray by brackets 54. As a cartridge is inserted into the tray, the slide is freed, resting on plate 47. Thus the tray may be loaded separated from the projector as well. Removal of a cartridge causes the same to grasp again the slide, thereby keeping the assembly of cartridge and slide together. The means by which this action is accomplished will be described later. Upon insertion of tray 83 into the projector, plate 47 is turned so that a hole 77 in the plate is engaged by a pin 93 on plate 44. Slot 53 in plate 47 is now in alignment with slot 46 in plate 44. All the slides rest free on plate 47, slipping on the same as tray 83 turns. Only the one slide above slot 53 can drop through, under the control of a slide lowering and raising mechanism to be described later.

The presentation position of a cartridge is the one in which the cartridge is ready for projection and playback. Movement of a slide from its upper position into its lower position is effected in the exemplified apparatus by the use of gravity as directional force and more specifically by moving the cartridge tray 83 from the position in which numeral "0" is in registry with marker 92 into a position in which any one of the compartments 89a is in registry with slot 46 in plate 44.

The means for raising a slide, rotating the tray one space and then lowering the next slide is now described by reference to FIGS. 4A, 4B, 4C and 4D.

An arm 73, a tray lock 75 and a rotating bar 76 are linked to an actuating means 72 which, upon application of an electrical current causes the three components to cycle in a synchronized manner. Means 72 and this cycle are covered in Patent 3,276,314. The cycle is schematically reviewed as follows. Arm 73 moves from position 73a to 73b. As bar 76 moves radially out of position 76a, lock 75 moves parallel to itself from position 75a to 75b. Then bar 76 moves angularly to position 76b thereby causing turning tray 83 by engagement with respective pin 74. As bar 76 returns to position 76a, lock 75 also returns to position 75a. Finally, arm 73 moves from 73b down to 73a.

Tray 83 is circled with eighty-two pins 74 which are engaged by lock 75 and bar 76. It now becomes apparent how a slide is raised and held, while the tray turns, until it sets on plate 47. While there are eight-two pins, the tray contains forty-one compartments. Therefore, two cycles of means 72 are required for the transport of one compartment 89a.

MECHANISM

Figure 5:
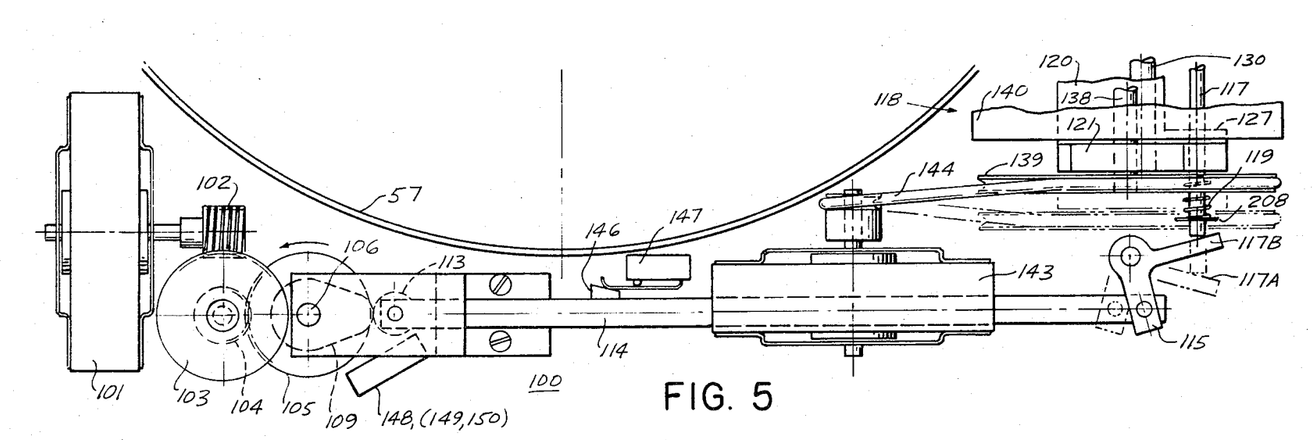
FIG. 5 is a plan view of the assembly for positioning and driving the capstan of the sound assembly of the projector and of part of the assembly for positioning the sound head or heads of the projector.
Figure 6:
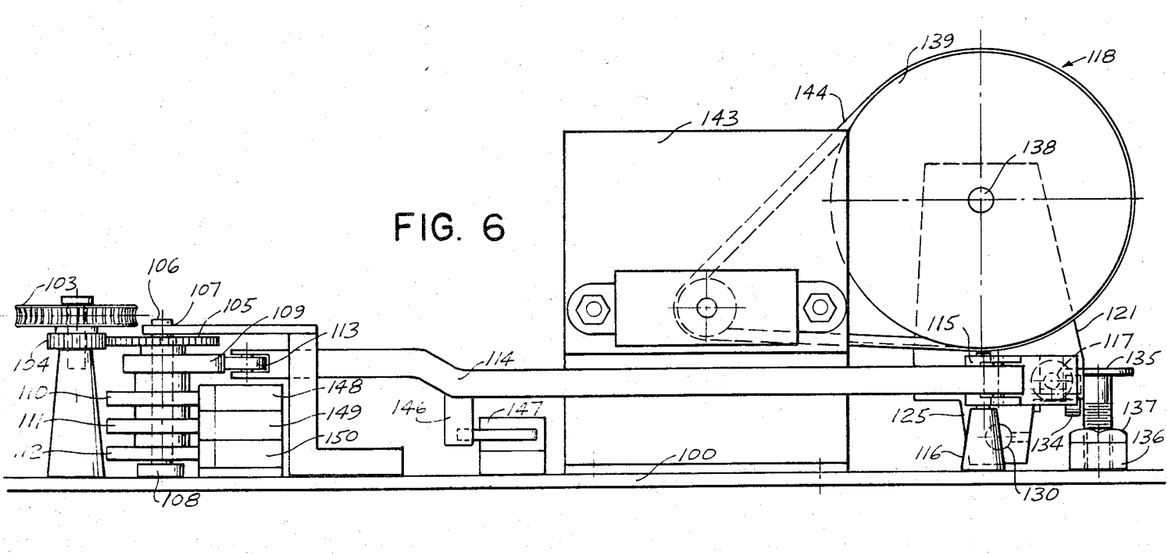
FIG. 6 is an elevational view of FIG. 5.

The whole mechanism of the projector according to the invention, except the cartridges and cartridge tray, is mounted on base plate 100. Referring to FIGS. 5 and 6, capstan positioning motor 101 via a worm 102, a worm wheel 103, a gear 104 and a gear 105 rotates a shaft 106 mounted between bearings 107 and 108. Mounted with gear 105 on shaft 106 are cams 109, 110, 111 and 112. A bracket 146 on a rod 114 is shown depressing a switch 147, making cam 109 both a mechanical and electrical operator. Cams 110, 111 and 112 are electrical operators for switches 148, 149 and 150 respectively. The action of the four cams will be described later.

Cam 109 via a cam follower 113, a rod 114, a bell crank 115 rotatably supported on a pillar 116 produces linear movement of rod 117 from position 117A to 117B. A capstan assembly 118, via a spring 119 retained on rod 117 by a C washer 208, moves to the limiting position of FIGS. 7 and 8.

Referring now to FIGS. 7, 8, 9 and 10, capstan assembly 118 is carried on an integral assembly of parts (or a casting) comprising a base plate 120, upwardly extending support members 121, 122, 123 and 124; downwardly extending members 125, 126 and horizontally extending support members 127 and 128.

For purposes of clarity, the cartridge playback timing mechanism supported on support members 122, 123 and bracket 129 is not shown in FIGS. 7, 8, 9 and 10.

Assembly 118, in its linear movement, is supported and restrained as follows: a rod 130 is fixed in support 125, by a set screw 131, and passes through a base support 132, support member 126 and a second base support 133. The second support is designed not only to permit rotational movement of assembly 118 about rod 130 but also permits adjustment of the angular position of the assembly with respect to base 100. Mounted in the side of base 120 is a roller 134, coacting with a wide-shouldered post 135 adjustably threaded into a base-mounted nut 136 which is secured by a lock-nut 137. A capstan shaft 138, supported in support members 121 and 124 has affixed to it a sheave 139, a flywheel 140, and a drive roller 141 and terminates in capstan 142. Reverting to FIGS. 5 and 6, a capstan drive motor 143, via a belt 144 and sheave 139, rotates shaft 138. As seen in FIG. 6, belt 144 biases assembly 118 counter-clockwise while post 135 exerts a clockwise restraint. The adjustability of post 135 is needed for critical positioning of capstan 142 with relation to the tape. Returning to FIGS. 7 and 10, bell crank 115 when turned clockwise is followed by assembly 118 due to the biasing effect of a spring 145 fixed between stationary support 132 and movable support 126.

A bellcrank 151 supported on a pillar 152 is acted upon by rod 117 and in turn, via a pin 153, an adjustment screw 154, a yoke 155 and a bearing 156, acts upon tape head assembly 285 in a direction and manner to be described. Also acting upon the tape head assembly in a different manner is a linkage comprising a post 158 shouldered at one end and terminating in a pinned link 159 at the other end and a spring 161, the post passing through a hole in an extension 160 of support 124. The action of spring 161 is two-fold, to be described later.

Figure 7:
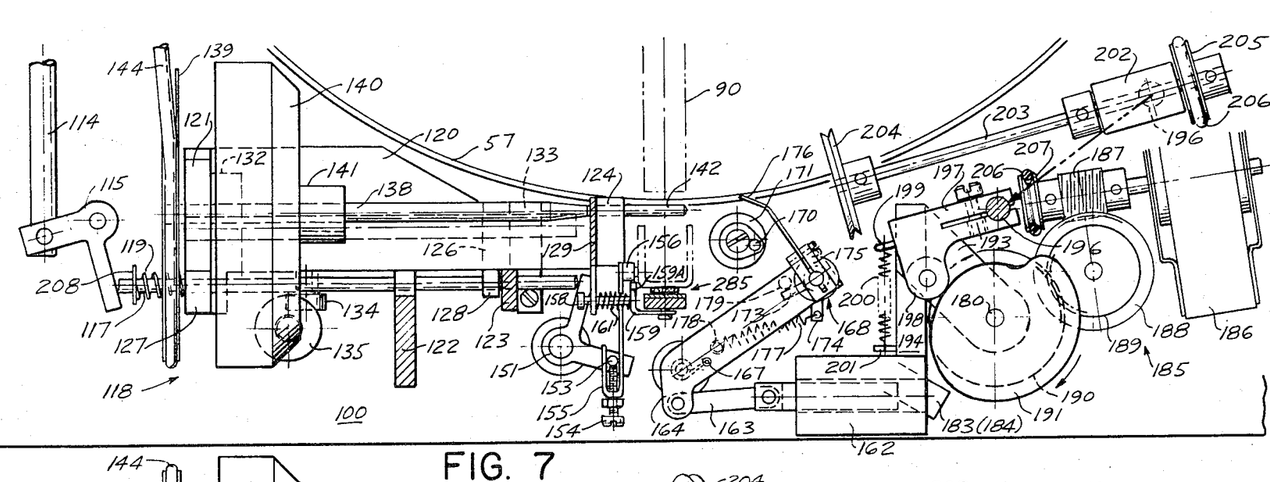
FIG. 7 is a plan view of the assembly disposed to the right of FIG. 5.
Figure 8:
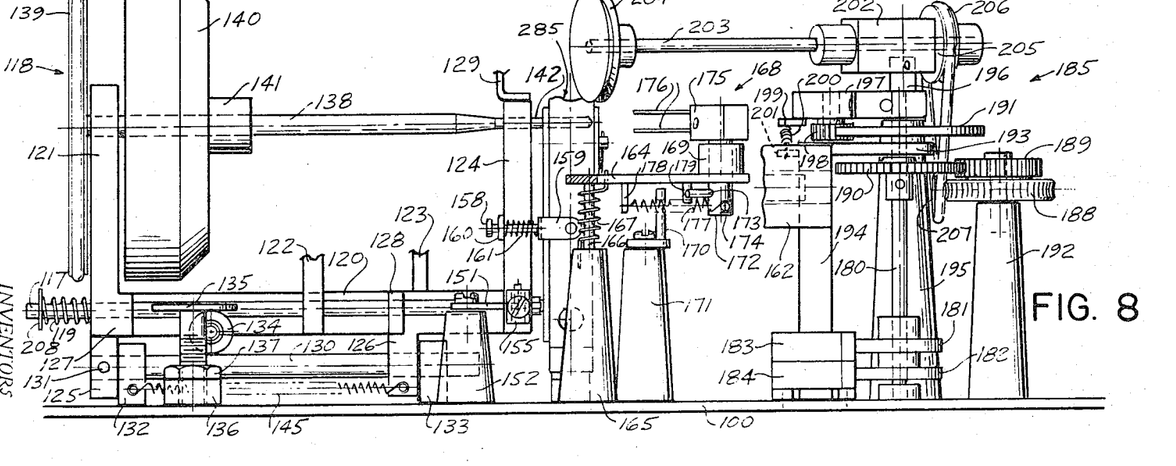
FIG. 8 is an elevational view of FIG. 7.
Figures 9, 10:
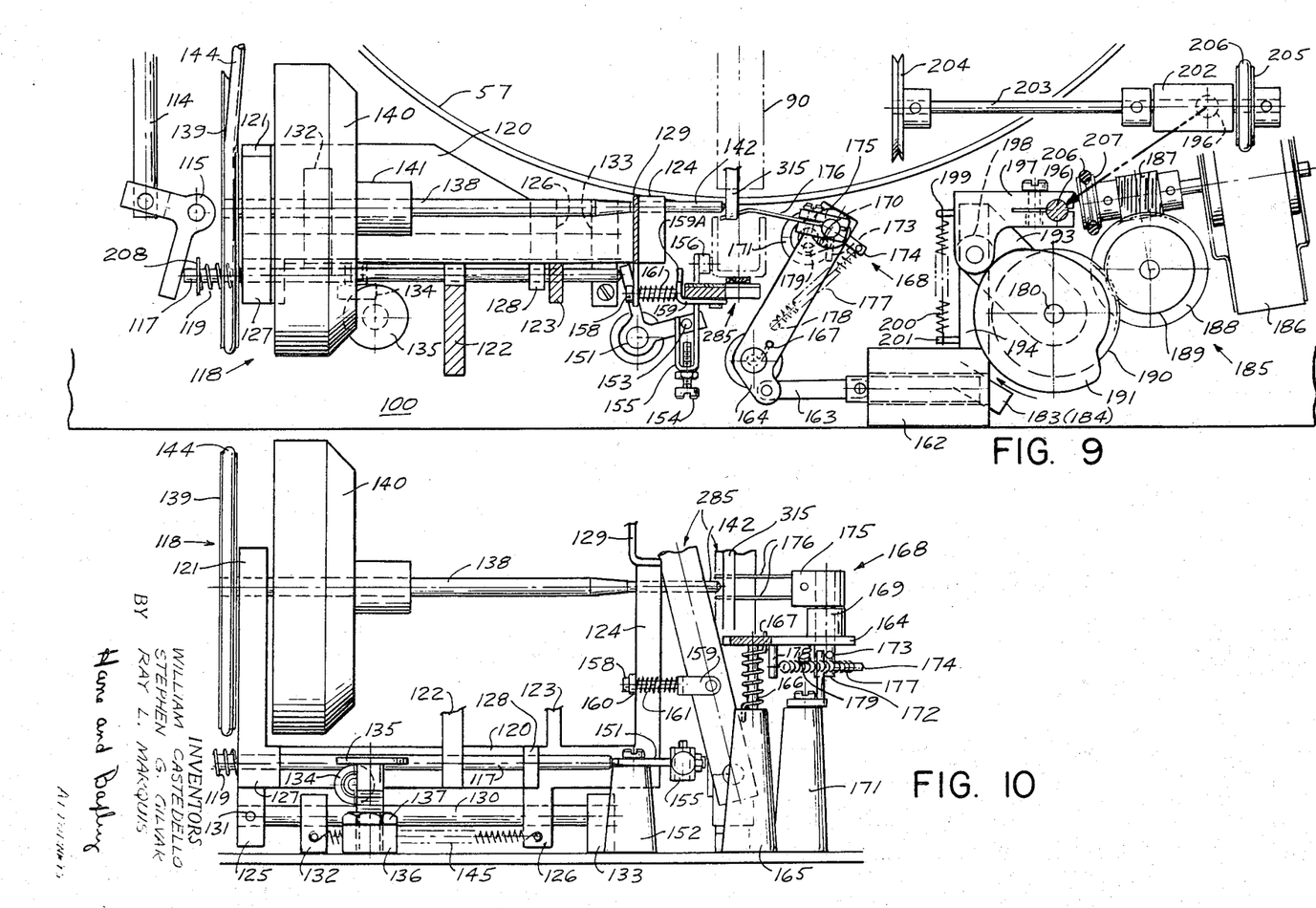
FIG. 9 is a view of the assembly of FIG. 7 in an alternate position of operation.
FIG. 10 is a view of the assembly of FIG. 8 in an alternate position of operation.

The tape puller mechanism comprises a solenoid 162, a link 163, a bell-crank 164 rotatably mounted on a pillar 165 by an extending shaft 166 on which a helical spring 167 is fixed to post 165 at one end and to bell-crank 164 at the other, an assembly 168 rotatable in a bushing 169 which is integral with the bell-crank, and an adjustable post 170 held on a pillar 171. Assembly 168 comprises a shaft 172 with a camming pin 173 and a spring holder 174 at the lower end and a clamp 175 at the upper end in which are held tape puller wires 176 disposed vertically just clear of capstan 142. A spring 177 biases assembly 168 clockwise with respect to bell-crank 164 to which it connects at a pin 178, and, as seen in FIGS. 7 and 8 is stopped by a pin 179 on 164. When solenoid 162 is energized, the bell-crank turns counter-clockwise. Just before completion of the turn, as determined by the solenoid armature traverse, camming pin 173 comes in contact with post 170. Due to the very small radius from the point of contact to the center of spring holder 174, the remaining slight rotation of bell-crank 164 produces a relatively large rotation of assembly 168 in bushing 169, as seen in FIGS. 9 and 10. The purpose of this action will be clarified later in the description of the tape cartridge in operation.

A tape rewind mechanism 185 comprises a motor 186 driving on the same shaft a worm 187 and a pulley 207. Worm 187 via a worm wheel 188, a gear 189 and a gear 190 drives a cam 191. Worm wheel 188 and gear 189 are pinned together and turn on a post 192, while gear 190 and cam 191 are pinned to shaft 180 and turn in a bearing plate 193 jutting from a support 194 which also supports solenoid 162. Shaft 180 extending downward to a base bearing also has pinned to it cams 181 and 182 operating switches 183 and 184 respectively. Another post 195 supports a rotatable shaft 196 to which is fixed at the lower part an adjustable clamping bracket 197 and at the upper end a bearing block 202. For purposes of clarity, shaft 196 is broken and the upper portion displaced as indicated by the arrow in FIGS. 7 and 9. Bracket 197 carries cam follower 198 and a support post 199 for a spring 200. This spring is fixed at its other end to a pin 201 on support 194 and serves to bias shaft 196 and its attachments counterclockwise against cam 191. Block 202 supports a shaft 203 which at one end carries a V-grooved rewind capstan or disc 204 and at the other end a pulley 205 connected to a pulley 207 by a belt 206.

When motor 186 is energized, rewind capstan 204 will rotate while it moves from the position of FIG. 7 to that of FIG. 9 and back again in a manner to be described later.

Turning to FIGS. 11 to 16, support 122 mounts a shaft 215 which is suitably secured against rotation, for instance by a set screw 216. Shaft 215 seats freely rotatable assemblies 217 and 218.

Assembly 217 is a rigid unit including a friction wheel 219, coacting with friction wheel 141, and a pinion 220 secured to wheel 219 for rotation in unison therewith.

Figures 11, 12, 13, 14, 15, 16:
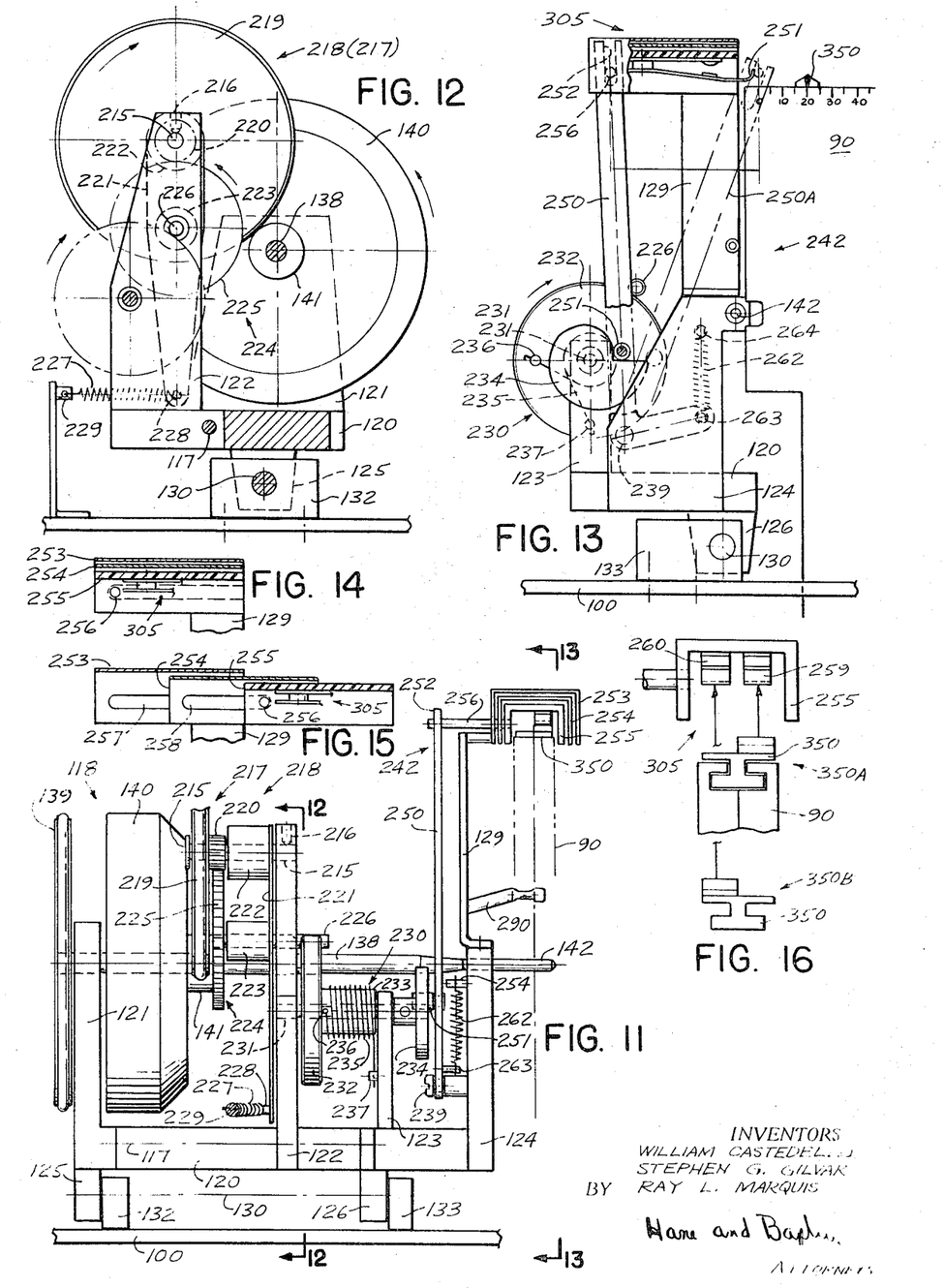
FIG. 11 is an elevational view of the cartridge playback timing mechanism.
FIG. 12 is an elevational sectional view taken along line 12—12 of FIG. 11.
FIG. 13 is an elevational section of FIG. 11 taken along line 13—13 of FIG. 11.
FIG. 14 is an elevational, partly sectional, view of the timer switch.
FIG. 15 is a view of the switch of FIG. 14 in an alternate position of operation.
FIG. 16 describes optional positioning of the timer cam.

Assembly 218 comprises a plate 221 to which bearings 222 and 223 are secured. Bearing 223 journals an assembly 224 including a gear 225 fixedly secured on a shaft 226. A spring 227 is attached to plate 221 at 228 and to a platform 100 at 229. The spring biases plate 221 in clockwise direction as seen in FIG. 12.

Supports 122 and 123 further support a rotatable assembly 230. This assembly includes a shaft 231 mounting a friction wheel 232 coacting with shaft 226, a spring arbor 233 and a cam 234 fixed to the shaft. A coil spring 235 loosely wound about spring arbor 233 is secured at one end to a post 236 on friction wheel 232 and at the other end to a post 237 extending from support 123. The spring biases assembly 230 in counter-clockwise direction as seen in FIG. 13. Rotation of the assembly in this direction is limited to a predetermined rest position by a mechanism 242. This mechanism comprises a fixed assembly on bracktt 129 extending from support 124 and a movable assembly including, among other components, an arm 250 pivoted to support 124 by suitable means such as a shoulder screw 239. A cam follower 251 on arm 250 engages cam 234 thereby biasing the cam into its rest position as previously described.

At the top of bracket 129 there is mounted a fixed channeled member 253 nesting a slidable channeled member 254 which, in turn, nests a slidable electrically non-conductive, for instance, plastic, channeled member 255. A pin 256 mounted on member 255 extends through slots 257 and 258 in members 253 and 254 respectively, and engages an elongated recess 252 in arm 250. Member 255 further mounts normally open electric switch contacts 259 and 260. As is evident, contacts 259 and 260 move a distance equal to the displacement of pin 256 during one revolution of cam 234 thereby causing movement of arm 250 from the full line position of FIG. 13 to the dotted line position 250A as is indicated by an arrow. As is further the evident, the movement of the contacts is rectilinear. Each of the contacts has preferably an entry shoe 251 to facilitate engagement with a non-metallic tab 350 on each cartridge 90 to force the respective contact into the closed position by engagement with the tab. As shown in FIG. 16, tab 350 may be inserted in either one of two positions (position 350A or position 350B) depending upon the choice of the switch to be operated, thus offering a choice of switch operations from cartridge to cartridge, or by inserting two tabs into one cartridge, permitting successive operation, with an adjustable time interval of both switches. The two contacts 259, 260 constitute a switch 305 which will be described hereinafter. Operation may also be controlled by omitting the tabs.

The exemplified sound slide projector, as controlled by engagement of switch contact 259 with tab 350A, may constitute a master unit. Switch contact 260 suitably modified in an obvious manner may be used to control one or several utilization devices as slave units. For instance, engagement of switch contact 260 with tab 350B may be used to control as slave unit a tape recorder, a phonograph, a silent projector for still pictures, a projector for silent motion picture film, etc.

A spring 262 is preferably connected on one end to arm 250 at 263 and on the other end to a post 264 extending from support 124. The spring serves to bias arm 250 toward the full line position of FIG. 13.

CARTRIDGE AND TAPE DRIVE

Figure 17:
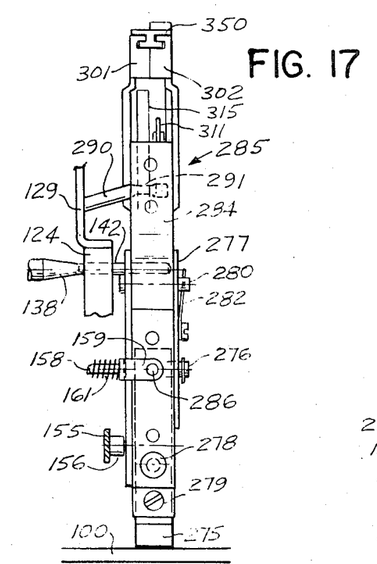
FIG. 17 is a front elevation of part of the mechanism of the projector and of the cartridge.
Figure 18:
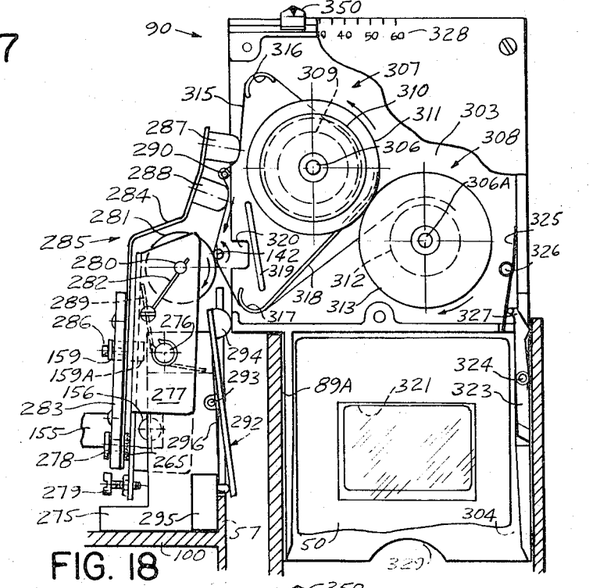
FIG. 18 is a side elevational view of FIG. 17, partially broken.
Figures 19, 20, 21, 22:
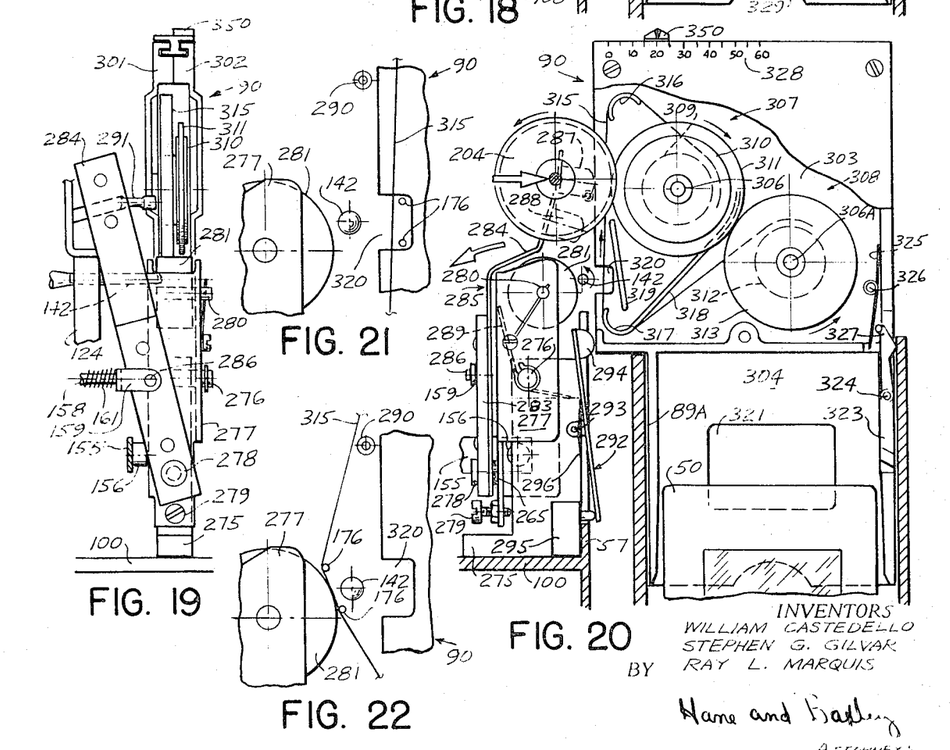
FIG. 19 is a view of FIG. 17 in an alternate position of operation.
FIG. 20 is a view of FIG. 18 in an alternate position of operation.
FIG. 21 is a partial elevational view at the capstan.
FIG. 22 is a view of FIG. 21 in an alternate position of operation.

Referring to FIGS. 17 through 20, the construction of the magnetic heads and capstan pressure roller supports will now be described. A pillar 275 mounts a pin 276 which trunnions a U-shaped bracket 277. The face of the bracket as seen in FIG. 19 supports near its lower end a shouldered pin 278 and below that an adjusting screw 279. Movement of the bracket 277 counter-clockwise stops when screw 279 butts against pillar 275. Bracket 277, in turn, by means of a pin 280 trunnions a pressure roller 281. A wire spring 282 passing through a hole in pin 280 biases the pin to the right as seen in FIG. 17. The far face of bracket 277 trunnions bearing 156 on yoke 155 (FIGS. 7 to 10). A post 278 trunnions an integral unit 285 comprising a plate 283 and formed arm 284. A soft felt or rubber spacer 265 separates unit 285 from bracket 277. A post 286 engages bracket 159.

Referring to FIGS. 9 and 10, movement of assembly 118 to the right will cause unit 285 to move into its vertical position before spring 161 is compressed as there is no resistance by the unit. At this point, pin 153 comes into contact with screw 154. Upon further movement of assembly 118, yoke 156 will turn the whole assembly of bracket 277 and unit 285 clockwise. Unit 285 is prevented from turning clockwise beyond the vertical position, as seen in FIG. 17, by an extension 159A on bracket 159 abutting against the far side of bracket 277 as seen in FIG. 18, and thus the remaining movement of assembly 118 is taken up by compression of spring 161. To ensure that the mechanism, terminating at the free end of screw 154 follows pin 153 on the return stroke, a spring 289 on pin 276 bearing on the base of a slot in pillar 275 biases the mechanism counter-clockwise as shown by the arrow in FIG. 20. The purpose of the aforesaid action is to ensure that tape heads 287 and 288 are in a substantially vertical position before moving in toward the cartridge and remain in such position when moving away from the cartridge. An arm 292 pivoted at 293 has a rounded button 294 at its upper end and contacts a switch 295 at its lower end. A spring 296 biases the assembly clockwise into one position of operation of switch 295. When a cartridge moves into and is in place, button 294 moves back. Switch 295 is then free to move into the alternate position of operation.

The cartridge 90 is comprised of two substantially matching but mirror-imaged molding parts 301 and 302 which when assembled define two cavities 303 and 304. In cavity 303 bearing posts 306 and 306a spindle tape drums 307 and 308 respectively. Drum 307 has at its far side (FIGS. 18 and 20) a tape winding surface 309. Its near side 310 has an annular groove which receives a neoprene ring 311. Drum 308 has at its far side a tape winding surface 312. Its near side 313 has the same diameter as the outer diameter of ring 311. By a spatial disposition of the two rotational centers 306 and 306a of the drums so that it is slightly less than the diameters of ring 311 and the near side 313 of drum 308, frictional contact is maintained between the drums. Tape winding surface 309 is slightly less in diameter than surface 312. Compensation due to the difference in winding rates is accommodated by having tape 315 slightly loose on drum 308 at the start of playback. The tape will not pull on the capstan and, when rewound by capstan 204, the tape will be tightly wound on drum 307. While the sound carrier has been referred to as "tape" in the specification and the claims for sake of simplicity, it should be understood that the concept of the invention also encompasses the use of magnetized wire.

As tape 315 moves from drum 307 to drum 308 it passes over tape guides 316 and 317. Partitions or ribs 318 and 319 prevent the possibility of the tape flapping during rewind and coming in contact with ring 311 on drum 307, particularly when capstan 142 retracts and releases the out-of-line excess of tape as seen in FIG. 18. Attached to arm 129 is a tape guide 290 disposed to pass between the tape heads as brackets 129 and 284 move relative to each other.

Referring to the tape puller mechanism, in FIGS. 7 to 19, wires 176 first swing into a position behind tape 315 as shown in FIG. 21. This position corresponds to the point of operation aforedescribed when pin 173 comes into contact with post 170. Cutouts 320 in both molding parts 301 and 302 accommodate the entry of the wires. At the end of the remaining rotation of bell-crank 164 and assembly 168, as seen in FIGS. 9 and 10, the wires have pulled the tape out of the cartridge as shown in FIG. 22. The lower one of the wires 176 pushes the tape against roller 281 and yields while the upper wire pushes the tape somewhat further, again limited by roller 281. It now becomes evident that linear movement of capstan assembly 118 will place capstan 142 and tape guide 290 behind tape 315. The wires on return to the position of FIG. 21 will clear capstan 142. The tape puller mechanism can be similarly controlled by a cam system.

FIG. 18 shows that the tape now has a partial wrap-around at both magnetic heads 287 and 288. This wrap improves the quality of the signal and creates drag to prevent tape spillage off drum 307. Also, guiding the tape in the reduced section 291 eliminates slewing at the heads.

Returning now to the cartridge, in playback, capstan 142 pulls tape 315 which rotates drum 307 which, in turn, rotates drum 308 upon which the tape winds. For rewind, motor 186 rotates capstan 204 (which, by the action of the gear and cam train, is brought into contact with neoprene ring 311) as shown by an arrow in FIG. 20. The friction drive of ring 311 on the near side 313 of drum 308 now serves to control the tape run-off.

Cavity 304 has slide apertures 321 in both parts 301 and 302 and accepts slide 50 into alignment with the apertures. The lower edge walls of the cavity are widened to allow for error in the alignment with the associated slide raising mechanism (not shown) and/or slight variations, or wear on the width of the slide. A lever 323 on a post 324 is biased clockwise by a light spring 325 set on a post 326 until a projection 327 on lever 323 comes in contact with the wall of the cartridge as seen in FIG. 20. It can be seen that inserting a slide will bias lever 323 counter-clockwise permitting the slide thereafter to be held by frictional contact until insertion of cartridge 90 in tray compartment 89a releases the slide. It can also be seen that removal of a cartridge not in the projection position will extract the slide.

The cartridge incorporates two further features: a tape playback time-setting scale 328 and a thumb notch 329 for manual removal of the slide. The slide may also be released by depressing lever 323.

OPERATION

Figures 23, 24:
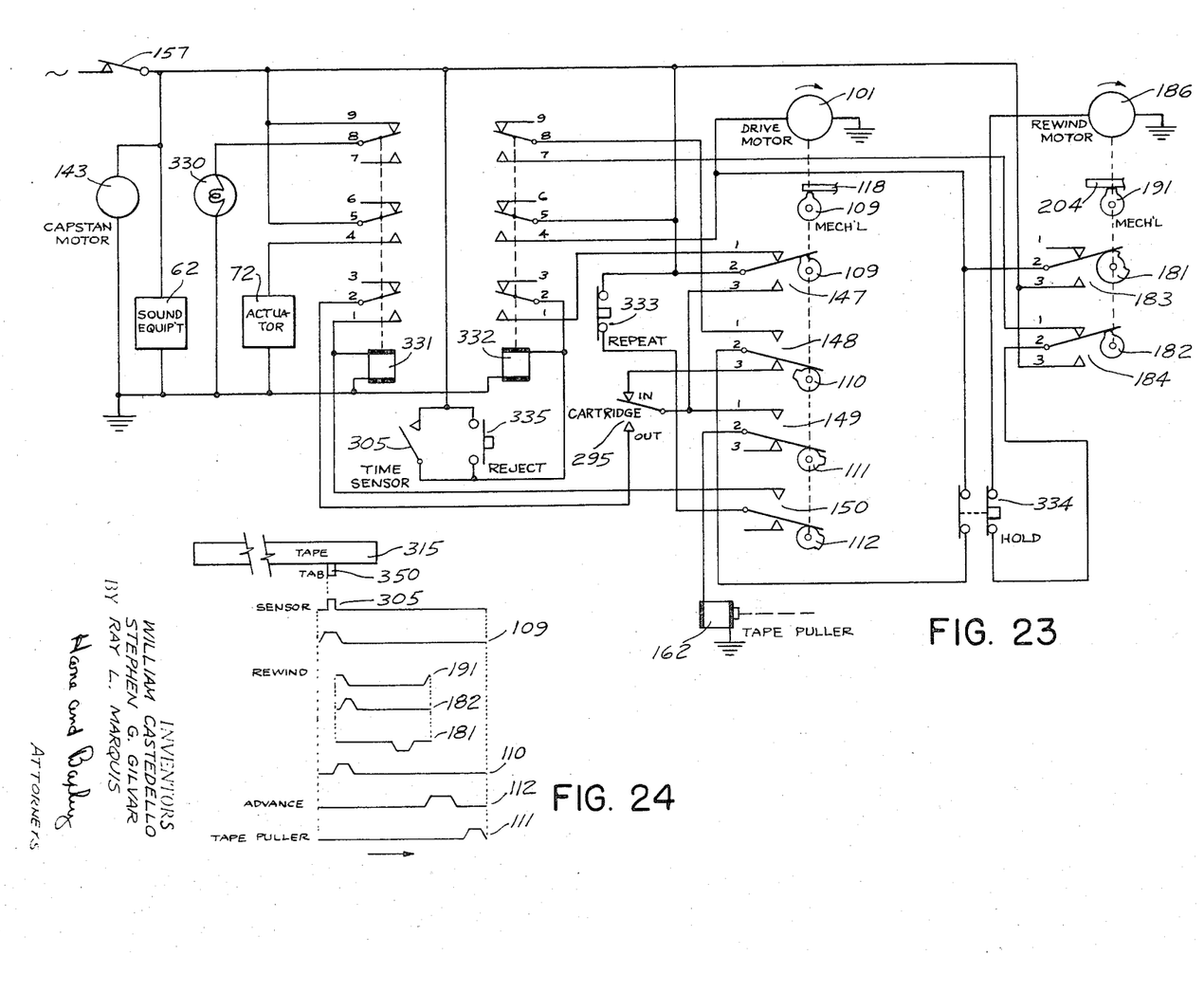
FIG. 23 is an electrical schematic of the apparatus.
FIG. 24 is a schematized timing diagram of the operating cycle.

The description of the operating cycle begins with slide projection and tape playback just started. FIG. 23 shows the electrical schematic as energized during this progress. The cam operators are indicated in simplified form acting on the associated switches. The time relationship of all the cams is diagrammatically shown in FIG. 24.

Power switch 157 is closed. The sound electronics equipment 62 and capstan motor 143 are energized. Projection lamp 330 (and its fan) are switched on due to closed contact 8–9 of a relay 331.

Referring to FIGS. 11 through 15, capstan assembly 118 is shown at the moment at which it reaches the playback position. Spring 227 pulling shaft 226 against friction wheel 232 starts arm 250 moving in toward the cartridge, overcoming the bias of springs 235 and 262. While playback is in progress, time-sensing switch 305 moves toward switch tab 350. When switch 305 is closed by tab 350, playback is completed in the following manner.

The closing of switch 305 energizes a relay 332. Contact 4–5 of relay 332 closes and drive motor 101 starts whereby through cam 109 and its follower train 113, 114 and 115 the withdrawal of capstan assembly 118 is started. Magnetic head assembly 285 also starts its motion away from the tape toward the positions of FIGS. 19 and 20, as shown by the arrow. Pressure roller 281 frees the tape before capstan 142 is withdrawn. This is explained by reference to FIGS. 7 through 10. As soon as rod 117 begins to move, yoke 155 is freed and spring 289 turns unit 285 through a small but adequate distance. Capstan 142 is delayed slightly by the easing of spring 119 which is slightly stronger than spring 145. When capstan assembly 118 starts to move, extension 160 of support 124 comes into contact with the head of post 158, and arm 284 turns.

Referring again to FIGS. 11–15, spring 227 relieved of its tension removes the pressure of shaft 226 on friction wheel 232 thereby allowing springs 235 and 262 to effect an abrupt return of contacts 259 and 260. However, relay 332 remains energized through its contact 1–2 and switch 147. Hence, drive motor 101 remains energized via contacts 4–5 of relay 332.

After a very short time during which drive motor 101 is running, cam 110 switches switch 148 (FIG. 23) from contact 3 to 1. Now voltage is supplied to rewind motor 186 via contact 4–5 of energized relay 332, hold switch 334, switch 148, contact 7–8 of relay 332, contact 1–2 of switch 184, and hold switch 334. As soon as the rewind motor starts, switch 184 transfers its contacts from 1 to 3. Now voltage is applied via switch 184 and hold switch 334 to the rewind motor which continues to run. This last transfer is necessary because momentarily, after switch 184 operates, switch 147 transfers its contacts from 1 to 3, relay 332 is deenergized, its contact 4–5 opens and drive motor 101 is stopped.

Rewind motor 186, though its gear train and cam 191 brings capstan 204 into contact with cartridge neoprene ring 311 and the tape rewinds as shown in FIG. 20. The rewind time may be fixed by way of example at three seconds, based on the playback time of the tape filling the reel. Cam 191 then returns capstan 204 to the out position. Just before the end of rewind, cam 181 transfers switch 183 to contact 3. Voltage is supplied via switch 183 to restart drive motor 101. Cam 110 transfers switch 148 back to contact 3. At the end of rewind, cam 182 transfers switch 184 back to contact 1 and stops rewind motor 186. Motor 101 does not stop because it now receives voltage via contact 2–3 of switch 147, cartridge switch 295, contact 2–3 of switch 148, and hold switch 334. Next, cam 112 transfers switch 150 to contact 1, energizing relay 331. Contact 8–9 of relay 331 opens, turning off the projector lamp 330. Contact 4–5 of relay 331 closes, energizing the cartridge advance means 72. Cam 112 operates for the time required for the double cycle of means 72 (FIG. 4D), placing the next cartridge and slide in position. Switch 150 returns to contact 3, relay 331 is deenergized and the projector lamp is switched on.

Just before the end of the cycle for motor 101, cam 111 transfers switch 149 to its contact 1. Voltage is supplied via contact 2–3 of switch 147 and switch 149 to tape puller solenoid 162. The tape is now moved out in front of capstan 142 and guide 290. As cam 109 moves capstan 142 and tape guide 290 into operating position, cam 111 returns switch 149 to contact 3. Spring 167 returns the tape puller to the out position. Cam 109 finally transfers switch 147 and motor 101 stops. As the mechanism is now in the position described at the beginning of the operation, the playback cycle has been completed and the next cycle is started.

The tray need not be filled with cartridges. If a cartridge space 89a comes into position, switch 295 will be biased to the out position. This breaks the current to motor 101 (which was energized as previously described when cam 112 transferred switch 150) and leaves relay 331 energized. The lamp will remain switched off and means 72 will cycle the tray to the next position or as often as necessary until a cartridge transfers switch 295 which will start up motor 101 to complete the interrupted portion of the cycle.

Instead of a relay control, frequency signals on the tape itself may also be used for controlling the operational cycle.

There are three controls incorporated into the schematic, to wit, Reject, Repeat and Hold.

Depressing the "Reject" button 335 duplicates the action of the sensor switch 305 at the end of playback and starts the cycle of drive motor 101.

Depressing the "Repeat" button 333 prevents energization of relay 331. The cartridge will not move out. The lamp stays on while motor 101 cycles, the tape rewinds, is pulled out from the cartridge and repeats its playback.

Depressing the "Hold" button 334 stops one or both motors 101 and 186. Playback will be completed but not repeated because switch 305 will be engaged by the cartridge tab 350. In this situation drive shaft 226 will share its friction with spring 227 and therefore slip on wheel 232.

SUMMARY OF OPERATIONAL CYCLE (1) Power is switched off and tray is at "0" position.
(2) Power is turned on and:

Optical system and sound system are energized.

Playback capstan motor stars rotation of capstan.
Slide support arm 73 rises.
Tray is turned to cartridge "1" position.
Slide support arm 73 lowers, carrying down slide 50.
Playback capstan starts moving in.
Tape puller engages tape to pull the tape out of the cartridge and toward a pressure roller.
Playback capstan completes movement to final position behind tape, as magnetic heads and pressure roller move in.
Tape puller retracts.
Playback starts and sensor switch starts movement toward a control switch.

(3) Sensor switch operates control switch and playback stops.

Playback capstan, magnetic heads and pressure roller retract.
Tape rewind motor starts the rewind capstan.
Rewind capstan moves into engagement with tape supply reel in cartridge and rewinds tape.
After three seconds (maximum rewind time presumed to be required) rewind capstan moves out and stops.
Slide support arm 73 raises for return of No. 1 slide cartridge.
Tray is turned to "2" position.

(4) Projector ready to start new cycle.

What is claimed is:

1. A sound slide projector for cartridges each having a casing including a rotary support for unwinding and rewinding magnetic tape and a compartment for releasably housing therein a slide, said projector comprising in combination:
    positioning means for successively moving cartridges placed in the projector into and out of a presentation position;
    an optical system for projecting slides;
    a sound system for playing back sound recorded on magnetic tape or recording sound on such tape, said sound system including a sound head movable into and out of a position coacting with the tape in a cartridge placed in the presentation position;
    said positioning means comprising a support means including a slot permitting passage of a slide of a cartridge in said presentation position to a projection position but blocking passage of the casing of said cartridge, a tray including locating means for receiving thereon a plurality of said cartridges and holding the same in a mutually fixed relationship, said tray being movably supported on the support means for moving successive cartridges into registry with said slot to effect passage of the respective slide into the projection position, said position of registry of a cartridge constituting the presentation position thereof;
    said optical system being arranged to project a slide in the projection position;
    slide return means for returning a slide from the projection position into the respective cartridge;
    sound head moving means for moving said sound head into and out of coaction with the tape in a cartridge in the presentation position;
    a tape playback mechanism;
    a tape rewind mechanism common for all cartridges;
    cycling means energizing said optical system and said sound system, moving the tray into a position in which a cartridge is in the presentation position, energizing the tape playback mechanism, activating the sound head moving means for moving the sound head into coaction with the tape; deenergizing the sound system and the optical system; activating the sound head moving means for moving the sound head out of coaction with the tape, deenergizing the tape playback mechanism, energizing the tape rewind mechanism, deenergizing the tape rewind mechanism and activating the slide return means in a predetermined sequence and time relationship.

2. The projector according to claim 1 wherein said tray comprises a plurality of partition walls mounted on one side of the tray, each two adjacent partition walls defining a cartridge compartment therebetween open at the bottom, said support means being disposed adjacent to the open side of the tray for retaining all the slides in the cartridges except the slide in registry with said slot.

3. The projector according to claim 2 wherein said tray is in the form of a drum and is rotatably supported on said support means, said compartments and said passage slot being substantially radially disposed with reference to the rotational axis of the drum.

4. The projector according to claim 1 wherein said support means comprise an upper platform and a lower platform, the upper platform including said passage slot, and the tray being movably supported on said upper platform whereby a slide in a cartridge in registry with said slot can pass through the same upon the lower platform.

5. The projector according to claim 4 wherein said slide return means comprise a movable arm engageable with a slide in registry with the slot to support said slide, movement of the arm toward the lower platform lowering the supported slide and movement of the arm toward the upper platform lifting said slide into the compartment of the respective cartridge, said cycling means including control means controlling said movements of the arm in a predetermined sequence and time relationship.

6. The projector according to claim 1 wherein said tape playback mechanism comprises a playback capstan; mounting means mounting said capstan for axial and rotational movement; drive means coupled with said capstan for axially and rotationally driving the same; a tape puller mechanism engageable with the tape in a cartridge in said presentation position for pulling a portion of the tape from an inactive position into a position of coaction with the capstan, said cycling means including control means controlling the movements of the capstan and of the tape puller mechanism so as to cause in a predetermined sequential order and time relationship pulling of a portion of the tape out of the respective cartridge, then axial displacement of the capstan into a position behind the tape relative to the respective cartridge and into coaction with the tape for driving the latter, then withdrawal of the tape puller mechanism from the tape, and finally, axial withdrawal of the capstan from said coacting position thereby freeing the pulled-out tape portion for return into the respective cartridge.

7. The projector according to claim 6 wherein said tape puller mechanism comprises a tape gripper means movable between a retracted position spaced apart from the tape and a forward position for gripping said portion of the tape to pull the same out of the cartridge casing upon movement of the gripper means into said forward position, said control means controlling the aforesaid movements of the capstan and the tape gripper means in said predetermined sequential order and time relationship.

8. The projector according to claim 6 wherein said tape gripper means comprise gripper elements extending between said tape portion and the cartridge casing in the forward position of said gripper means.

9. The projector according to claim 6 wherein said cycling means further include control means for controlling said sound head moving means to move the sound head into coacting engagement with the tape when the playback capstan is placed behind said tape portion.

10. The projector according to claim 1 wherein said common tape rewind mechanism comprises a rewind member movable into and out of driving coaction with said rotary support for the tape in a cartridge in the presentation position; and drive means for driving said rewind member, said cycling means including rewind control means effecting movement of said rewind member into said coacting relationship and retraction thereof in a predetermined sequential order and time relationship.

11. The projector according to claim 10 wherein said rewind member comprises a capstan in the form of a drive wheel and said rotary support comprises a supply reel, said rewind capstan being movable by said control means into and out of rotation transmitting frictional engagement with the peripheral rim of said supply reel.

12. The projector according to claim 1 wherein said cycling means further comprise time sensing means for controlling the sequential operations of said tape playback mechanism and said tape-rewind mechanism, said time sensing means including a switch actuating means on each cartridge and a common control switch means supported by the tape playback mechanism and movable by said mechanism upon activation thereof, toward said switch actuating means for operation of the control switch means a predetermined period of time after activation of the tape playback mechanism, operation of said control switch means stopping the tape playback mechanism and activating the tape-rewind mechanism for the purpose aforesaid.

13. The projector according to claim 1 wherein said cycling means comprise drive means for stepwise moving said tray to place successive cartridges in the presentation position, and said cycling means include control means controlling first said tray drive means for moving the tray through a part of one step, then the slide return means for returning a slide in the projection position to the respective cartridge in the presentation position, and again the tray drive means for completing said one step.

14. The projector according to claim 1 wherein said sound system further comprises movable tape pressure means engageable with said tape for pressing the same into a wraparound engagement with said sound head, and wherein said cycling means include control means for moving said tape pressure means into said engagement with said tape substantially simultaneously with the movement of the sound head into engagement with the tape.

15. A sound slide cartridge for a sound slide projector as defined in claim 1, said cartridge comprising in combination:

a cartridge casing including a first compartment and a second compartment, the second compartment being arranged to accommodate a slide therein;

a tape supply reel and a tape take-up reel rotatably mounted in said first compartment;

guide means mounted in the first compartment for guiding tape therein from one of said reels to the other, the walls of said casing defining said first compartment including an opening exposing a tape portion extending between the two reels for applying playback drive and rewind drive to the tape, and the walls of the casing defining said second compartment including an opening for removal of the slide from said compartment and return of the same into said compartment.

16. The cartridge according to claim 15 wherein said first and second compartments are disposed in substantially coplanar arrangement in the cartridge casing.

17. The cartridge according to claim 16 wherein said casing has a substantially rectangular configuration, said first compartment being the upper compartment in the operational position of the cartridge and said exit and reentry opening for the slide being a slot in the bottom edge of the casing.

18. The cartridge according to claim 15 and comprising releasable slide retaining means in the second compartment for releasably retaining a slide therein, said retaining means being automatically released upon insertion of the cartridge-containing tray into the projector.

19. The cartridge according to claim 15 and comprising time-sensing means supported by the cartridge casing for controlling the time of the playback drive and the rewind drive applied to tape in the first compartment of the cartridge.

20. The cartridge according to claim 19 wherein said time-sensing means are adjustably mounted on the cartridge casing for varying the periods of time as sensed by said sensing means.

References Cited

UNITED STATES PATENTS

| | | | |
|---|---|---|---|
| 3,276,314 | 10/1966 | Robinson | 353—111 |
| 3,408,139 | 10/1968 | Schwartz et al. | 353—15 |

SAMUEL S. MATTHEWS, Primary Examiner